Oct. 2, 1934.  W. W. SHAVER  1,975,297
INSULATOR
Filed May 17, 1930
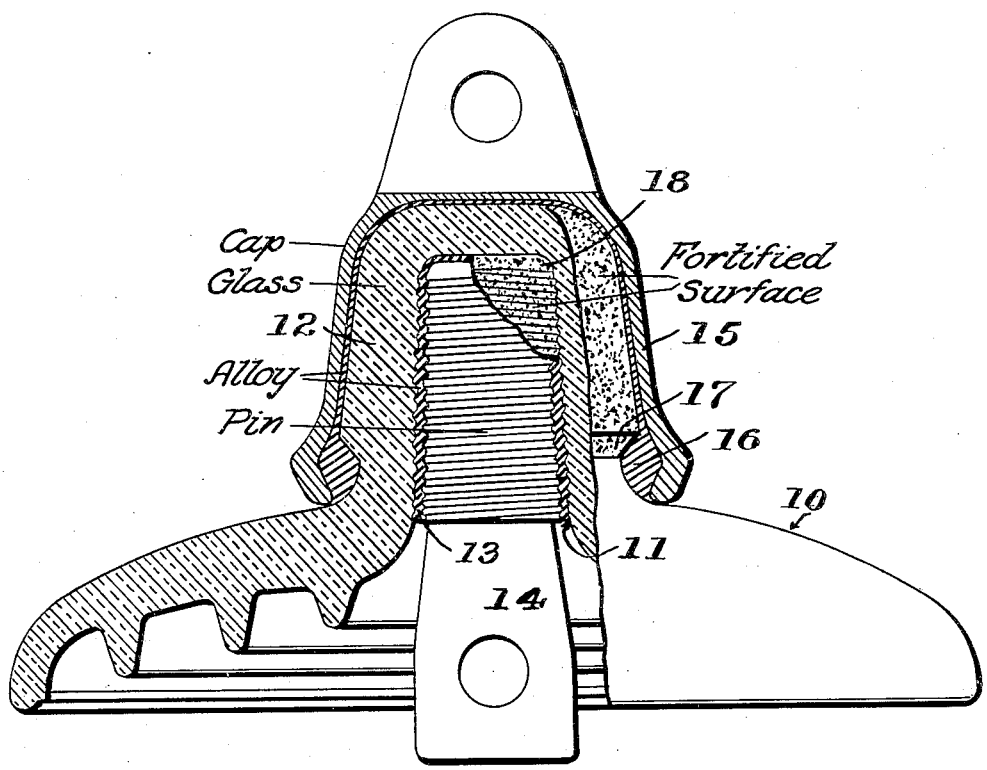
INVENTOR
William W. Shaver.
BY
ATTORNEYS.

Patented Oct. 2, 1934

1,975,297

UNITED STATES PATENT OFFICE 1,975,297

INSULATOR

William W. Shaver, Corning, N. Y., assignor to Corning Glass Works, Corning, N. Y., a corporation of New York Application May 17, 1930, Serial No. 453,317

6 Claims. (Cl. 173—318)

This invention relates to insulators and more particularly to insulators made from glass.

Heretofore it has been difficult to produce glass insulators suitable for all purposes due to the apparent lack of tensile strength of the material. An article by Gehlhoff and Thomas, appearing on page 114, Volume 10, No. 5, of "The Glass Industry" of May 1929, shows that by the fortifying, that is, the acid etching of the surface of glass rods to remove minute surface imperfections and leave no sharp angles the tensile strength of the rods can be improved. I am also aware of some very early work of Brodmann on the same subject, but in so far as I am aware, no commercial use of fortifying glass articles has ever been attempted.

I tried fortifying low expansion glass insulators of the suspension type and after considerable experiment I found that the average strength of fortified insulators was improved over the average strength of unfortified insulators of the same size and composition.

Further experiments have shown that by fortifying the zones of a low expansion glass suspension type insulator which in service are normally under tension, I am enabled to produce a satisfactory product whose breaking strength is increased to at least twice the breaking strength of unfortified insulators. In fact, in tests which I have conducted fortified insulators have shown an average breaking strength of over 20,000 pounds whereas the average breaking strength of unfortified insulators of the same dimensions was only 10,000 pounds.

When it is realized that low expansion borosilicate glass such as that disclosed in Sullivan and Taylor Patent No. 1,304,623 is by far the most satisfactory insulating material for high-tension electrical current but that heretofore, due to the impossibility of developing its inherent mechanical strength, its use in the production of insulators has been materially restricted, the importance of anything which will develop such mechanical strength becomes paramount.

The object of the present invention is to improve the mechanical strength of low expansion glass insulators and hence render available for insulating purposes a material possessing unusually high electrical surface and volume resistivity, high dielectric strength, high resistance to lightning impulse voltages, high resistance to power arcs, low dielectric loss and high resistance to weathering and chemical attack.

The above and other objects may be attained by employing my invention which embodies the fortifying of the zones of low expansion glass insulators which are under tension.

By way of illustration of the application of my invention to one type of insulator, I have shown in the drawing a cap and pin type suspension insulator showing portions broken away to more clearly illustrate my invention.

In carrying my invention into practice, I first form an insulator shell 10 of low expansion glass preferably such as that disclosed in the Sullivan and Taylor patent above referred to. This shell is formed with a pin hole 11 and an integral head 12 and fastened in the pin hole by means of a suitable alloy 13 is a pin 14. A cap 15 is fitted over the head 12 and is fastened in place by means of a suitable socket 16 which is formed by pouring a suitable alloy in the space between the head 12 and the cap 15. All of this is quite common practice in the fastening of metal to glass.

In order to develop the necessary mechanical strength of the glass and render it suitable for use under severe strains, I find it desirable to fortify those zones of the insulator which are subjected to the most severe tensile stresses. Such fortification consists in subjecting the part to be fortified to a mild etching process by means of which a sufficient amount of the glass surface is removed to eliminate the minute surface checks and imperfections which are formed in the glass during pressing and cooling, it being understood that the etching which takes place is not strong enough to produce the rough, pitted surfaces ordinarily known as etched surfaces.

To accomplish this on glasses of the Sullivan and Taylor type I find it desirable to immerse the portion of the glass to be fortified for a period of about fifteen minutes in a fortifying solution consisting, for example, of a solution of one part 60% hydrofluoric acid and one part of 98% sulphuric acid. The glass part is then washed and dried and is then ready for the assembling of the hardware thereon.

In producing suspension type glass insulators such as is illustrated in the accompanying drawing, the portions 17 and 18 are fortified as those are the portions upon which the most severe tensile stresses are imposed and, consequently, are the parts which should be free from surface checks and imperfections in order to develop the inherent mechanical strength of the glass. Preservation of the mechanical strength thus developed is essential and hence no scratches should be made in the glass during the assembly of the hardware thereon, consequently, care must be exercised to see that the molten alloy is the only metal which contacts with the glass.

From the foregoing it will be seen that by employing my invention which consists in fortifying a low expansion glass insulator, I am enabled to produce mechanically strong suspension type insulators possessing the exceedingly valuable electrical properties above enumerated.

Having thus described my invention, what I claim is:

1. In an insulator, an insulating body of low expansion glass and a fortified surface on said body.

2. In an insulator, an insulating body of low expansion glass, certain portions of which have been fortified.

3. In an insulator, an insulating body of low expansion glass, certain portions of which have been fortified, and metal fittings fastened to the insulating body.

4. In a suspension type insulator, an insulating body of low expansion glass having a head and a pinhole both of which have been fortified, a metal cap fastened to the head, and a metal pin fastened in the pinhole.

5. The method of attaching metal fittings to insulators which includes fortifying a surface of a low expansion glass insulating body.

6. The method attaching metal fittings to insulators which includes fortifying certain zones of a low expansion glass insulating body and fastening insulator hardware on said body without scratching the fortified zones.

WILLIAM W. SHAVER.